US010165535B2

(12) United States Patent
Sorrentino et al.

(10) Patent No.: US 10,165,535 B2
(45) Date of Patent: *Dec. 25, 2018

(54) METHODS AND WIRELESS DEVICES FOR ENABLING SYNCHRONIZATION IN D2D COMMUNICATIONS

(71) Applicant: Telefonaktiebolaget LM Ericsson (publ), Stockholm (SE)

(72) Inventors: Stefano Sorrentino, Solna (SE); Qianxi Lu, Beijing (CN); Qingyu Miao, Beijing (CN); Iana Siomina, Täby (SE); Stefan Wänstedt, Luleå (SE); Zhenshan Zhao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,491

(22) Filed: Jan. 23, 2017

(65) Prior Publication Data

US 2017/0164388 A1 Jun. 8, 2017

Related U.S. Application Data

(63) Continuation of application No. 14/420,460, filed as application No. PCT/SE2014/050787 on Jun. 25, 2014, now Pat. No. 9,681,409.

(Continued)

(51) Int. Cl.
*H04W 4/00* (2018.01)
*H04W 56/00* (2009.01)
(Continued)

(52) U.S. Cl.
CPC ......... *H04W 56/002* (2013.01); *H04W 8/005* (2013.01); *H04W 72/0446* (2013.01);
(Continued)

(58) Field of Classification Search
CPC ......... H04W 72/1263; H04W 72/0446; H04W 76/023; H04W 92/18
See application file for complete search history.

(56) References Cited

U.S. PATENT DOCUMENTS

2013/0322413 A1* 12/2013 Pelletier ............ H04W 72/1289
370/336
2014/0056220 A1 2/2014 Poitau et al.
(Continued)

FOREIGN PATENT DOCUMENTS

WO 2013104084 A1 7/2013

OTHER PUBLICATIONS

Ericsson, "Realization of D2D broadcast communication", 3GPP TSG-RAN WG2 #83bis, Oct. 7-11, 2013, pp. 1-6, Ljubljana, Slovenia, Tdoc R2-133300.
(Continued)

*Primary Examiner* — Clemence S Han
(74) *Attorney, Agent, or Firm* — Coats & Bennett, PLLC

(57) ABSTRACT

A first and a second wireless device and a respective method performed thereby for enabling D2D communication there between are provided. The method performed by the first wireless device comprises obtaining a timing reference and a time offset, from a wireless network; and transmitting, to the at least one second wireless device, an SA in accordance with the obtained timing reference, the SA comprising the time offset. The method further comprises transmitting data, to the at least one second wireless device, in accordance with an uplink timing, wherein the uplink timing is based on the time offset and the timing reference.

26 Claims, 8 Drawing Sheets

Related U.S. Application Data

(60) Provisional application No. 61/897,321, filed on Oct. 30, 2013.

(51) Int. Cl.
*H04W 76/14* (2018.01)
*H04W 8/00* (2009.01)
*H04W 72/04* (2009.01)
*H04W 72/12* (2009.01)
*H04W 92/18* (2009.01)

(52) U.S. Cl.
CPC ....... *H04W 72/1263* (2013.01); *H04W 76/14* (2018.02); *H04W 72/1289* (2013.01); *H04W 92/18* (2013.01)

(56) References Cited

U.S. PATENT DOCUMENTS

| | | | |
|---|---|---|---|
| 2014/0086176 A1 | 3/2014 | Liu et al. | |
| 2015/0016428 A1* | 1/2015 | Narasimha | H04L 5/0058 370/336 |
| 2015/0146687 A1 | 5/2015 | Kim et al. | |
| 2015/0181546 A1* | 6/2015 | Freda | H04W 56/0015 370/336 |
| 2015/0195828 A1 | 7/2015 | Fujishiro et al. | |
| 2015/0215881 A1 | 7/2015 | Parkvall et al. | |
| 2015/0245395 A1* | 8/2015 | Yamazaki | H04W 76/023 455/426.1 |
| 2015/0281940 A1 | 10/2015 | Yu et al. | |
| 2015/0295743 A1 | 10/2015 | Hwang et al. | |
| 2015/0304902 A1 | 10/2015 | Yu et al. | |
| 2015/0334758 A1 | 11/2015 | Kim et al. | |
| 2015/0341878 A1 | 11/2015 | Lee et al. | |
| 2015/0351059 A1 | 12/2015 | Seo | |
| 2015/0365994 A1 | 12/2015 | Yu et al. | |
| 2015/0373656 A1 | 12/2015 | Kim et al. | |
| 2016/0014668 A1 | 1/2016 | Chou et al. | |

OTHER PUBLICATIONS

Nokia, et al., "D2D Communication", 3GPP TSG-RAN WG1 Meeting #73, May 20-24, 2013, pp. 1-6, Fukuoka, Japan, R1-132318.
Ericsson, "Synchronization Procedures for D2D Discovery and Communication", 3GPP TSG RAN WG1 Meeting #74bis, Oct. 7-11, 2013, pp. 1-6, Guangzhou, China, R1-134720.
Ericsson, "On D2D broadcast communication procedures", 3GPP TSG-RAN WG1 Meeting #74bis, Oct. 7-11, 2013, Guangzhou, R. of China, R1-134704.

* cited by examiner

METHODS AND WIRELESS DEVICES FOR ENABLING SYNCHRONIZATION IN D2D COMMUNICATIONS

RELATED APPLICATIONS

The present application is a continuation of U.S. patent application Ser. No. 14/420,460, which was filed on Feb. 9, 2015, which is a national stage application of PCT/SE2014/050787, filed Jun. 25, 2014, and claims benefit of U.S. Provisional Application 61/897,321, filed Oct. 30, 2013, the disclosures of each of which are incorporated herein by reference in their entirety.

TECHNICAL FIELD

The present disclosure relates to Device-to-Device, D2D, communication and in particular to a respective first and second wireless device and a respective method performed by the respective first and second wireless device for enabling D2D communication there between.

BACKGROUND

Recent developments of the $3^{rd}$ Generation Partnership Project, 3GPP, Long Term Evolution, LTE, facilitate accessing local IP-based services in various places, such as at home, office, or public hot spots, or even in outdoor environments. One of the use cases for the local IP access and local connectivity involves a so-called D2D communication mode, wherein wireless devices, such as for example user equipments, UEs, in close proximity (typically less than a few tens of meters, but sometimes up to a few hundred meters) of each other communicate with each other directly.

Because D2D wireless devices may be closer to each other than cellular UEs that have to communicate via at least one cellular access point (e.g. a Radio Base Station, RBS, such as an evolved Node B, eNB), the D2D communication enables a number of potential gains over the traditional cellular technique, including capacity gain, peak rate gain, and latency gain.

The capacity gain may be achieved, for example, by reusing radio resources (e.g. Orthogonal Frequency Division Multiplexing, OFDM, resource blocks) between D2D and cellular communications and by reducing the number of links between wireless devices such as UEs from two to one and accordingly reducing the radio resources required for one link. The peak rate gain directly results from the relatively short distance between D2D UEs and the potentially favourable propagation condition there between. The latency gain is also a direct result of the single relatively short link between D2D UEs.

FIG. 1a illustrates an example of a mixed cellular and D2D network, wherein wireless device 101 is a cellular UE which communicates via an eNB 110, whereas wireless devices 102 and 103 are D2D wireless devices which communicate with each other directly. In such a mixed cellular and D2D network, D2D communications share radio resources with UL cellular communications, and a Time Division Duplex (TDD) is used as the duplex scheme for the bi-directional D2D communications.

For a pure cellular system using a Frequency Division Duplex, FDD, scheme, UL reception timings at an eNB are aligned for cellular subframes transmitted from all cellular wireless devices served by the eNB, while DL transmission timings are aligned with the UL reception timings, as illustrated at the top of FIG. 1b. In FIG. 1b, the wireless devices are denoted terminal 1 and terminal 2. Examples of a wireless device are a UE, a mobile telephone, a mobile station, a laptop, a personal digital assistant, PDA, and any other portable device or terminal having communication means enabling the device or terminal to communicate wirelessly with any other device, terminal or communication node.

In order to achieve the alignment of DL transmission and UL reception timings at the eNB side, in DL, each cellular wireless device receives a synchronisation signal from the eNB, and adjusts its reception timing according to the received synchronisation signal, so that the reception timing for a subframe at the wireless device coincides with the transmission timing for the subframe at the eNB plus a propagation delay, TP, from the eNB to the UE. In the middle and at the bottom of FIG. 1b, the TPs for a wireless device (denoted terminal 1 in FIG. 1b) close to the eNB and a wireless device (denoted terminal 2 in FIG. 1b) far from the eNB are respectively denoted as $T_{P,1}$ and $T_{P,2}$.

In UL, each wireless device receives from the eNB a timing advance, TA, calculated by means of random access channel, RACH, procedure and/or based on UL demodulation reference signal, DMRS, estimation, and adjusts its UL transmission timing in advance of its DL reception timing according to the TA. In the middle and at the bottom of FIG. 1b, the TAs for the terminal 1 close to the eNB and the terminal 2 far from the eNB are respectively denoted as $T_{A,1}$ and $T_{A,2}$.

In the mixed cellular and D2D network, a wireless device or UE may operate as a D2D receiving, RX, UE to receive data from its corresponding D2D transmitting, TX, UE and/or operate as a D2D TX UE to transmit data to its corresponding D2D RX UE, in addition to receiving and transmitting data from and to an eNB.

Cellular systems often define multiple states for the terminal matching different transmission activities. In LTE, two states are defined:

RRC_IDLE, where the wireless device is not connected to a particular cell and no data transfer in either uplink or downlink may occur. The wireless device is in DRX most of the time except for occasionally monitoring the paging channel.

RRC_CONNECTED, where the wireless device is connected to a known cell and can receive downlink transmissions. Although expressed differently in the specifications, it can be thought to have two "sub-states":

UL_IN_SYNC, where the wireless device has a valid timing advance value such that uplink transmissions can be received without collisions between different wireless devices.

UL_OUT_OF_SYNC, where the wireless device does not have a valid timing advance value and hence cannot transmit data in the uplink. Prior to any transmission, a random access must be performed to synchronise the uplink.

In LTE, random access is used to achieve uplink time synchronisation for a wireless device which either has not yet acquired, or has lost, its uplink synchronisation. Once uplink synchronisation is achieved for a wireless device, the eNB can schedule orthogonal uplink transmission resources for it. Relevant scenarios in which the RACH is used are therefore:

1) A wireless device in RRC_CONNECTED state, but not uplink-synchronised, needing to send new uplink data or control information (e.g. an event-triggered measurement report or a hybrid ARQ acknowledgement in response to downlink data transmission);

2) A wireless device in RRC_CONNECTED state, handing over from its current serving cell to a target cell;

3) For positioning purposes in RRC_CONNECTED state, when timing advance is needed for wireless device positioning;

4) A transition from RRC_IDLE state to RRC_CONNECTED, for example for initial access or tracking area updates;

5) Recovering from radio link failure.

For D2D communication, it is necessary to define the transmission and reception timing. In principle, any transmission timing could be used as long as transmissions do not interfere with cellular communication. However, an attractive approach for D2D communication is (especially for broadcast type communication) to require the D2D TX to be RRC connected, but allow RRC idle UEs to receive.

In other words, to use the same transmission timing at the D2D TX for D2D transmissions as for cellular uplink transmissions. This ensures that D2D transmissions do no collide with uplink transmissions from the same device and avoids a (potentially complicated) additional timing advance mechanism for direct D2D communication.

So a problem is how to enable the RRC_IDLE UEs to receive data. As an RRC_IDLE UE, as stated above, only has DL timing, but no information of UL timing, i.e. TA value. In this case, it cannot receive the D2D TX signal from another device since:

Considering the propagation delay within each D2D link, the timing difference is 2*link length, e.g., we need to handle 2*500 m/c=3.3 µs (the D2D link length maybe larger than 500 m in an extreme case); c is the speed of light equal to $3*10^8$ m/s;

Considering the propagation delay between D2D TX and eNB, the timing difference between UL timing (at TX side) and DL timing (at Rx side) is 2*UE-eNB link length, e.g., we need to handle 2*1 km/c=6 µs.

So to handle this (6+3.3) µs difference (plus the channel delay spread), it is not enough to use the traditional normal (Cycic Prefix) CP—5 µs length, since this would cause reception failure at the D2D Rx.

Even though one may argue that we can use extended CP (16 µs), it means:

Less legacy support on eNBs: normal CP is a widely used case, while extended CP is mostly limited to evolved Multimedia Broadcast Multicast Service (eMBMS) scenario;

Limited to intra-cell scenario: For un-sync eNBs scenario, the timing difference between neighbouring cells is not predicted, so even 16 µs will not guarantee inter-cell D2D communication;

So a problem here is how the D2D Rx gets the timing info of the D2D TX for reception, while remaining in RRC_IDLE.

SUMMARY

The object is to obviate at least some of the problems outlined above. In particular, it is an object to provide a first wireless device and a method performed by the first wireless device for enabling D2D communication with at least one second wireless device. Further, it is an object to provide a second wireless device and a method performed by the second wireless device for enabling D2D communication with a first wireless device. These objects and others may be obtained by providing a first and a second wireless device and a respective method performed by the first and the second wireless device according to the independent claims attached below.

According to an aspect, a method performed by a first wireless device for enabling D2D communication with at least one second wireless device is provided. The method comprises obtaining a timing reference and a time offset, from a wireless network; and transmitting, to the at least one second wireless device, a Scheduling Assignment, SA, in accordance with the obtained timing reference, the SA comprising the time offset. The method further comprises transmitting data, to the at least one second wireless device, in accordance with an uplink timing, wherein the uplink timing is based on the time offset and the timing reference.

According to an aspect, a method performed by a second wireless device for enabling D2D communication with a first wireless device is provided. The method comprises receiving, from the first wireless device, an SA comprising a time offset; and determining a timing reference. The method further comprises determining a reception timing based on the received time offset and the determined timing reference; and receiving data transmitted from the first wireless device in accordance with the determined reception timing.

According to an aspect, a first wireless device adapted for enabling D2D communication with at least one second wireless device is provided. The first wireless device comprises a processor and memory, the memory comprising instructions, e.g. by means of a computer program, which when executed by the processor causes the first wireless device to obtain a timing reference and a time offset, from a wireless network; to transmit, to the at least one second wireless device, an SA in accordance with the obtained timing reference, the SA comprising the time offset; and to transmit data, to the at least one second wireless device, in accordance with an uplink timing, wherein the uplink timing is based on the time offset and the timing reference.

According to an aspect, a second wireless device adapted for enabling D2D communication with a first wireless device is provided. The second wireless device comprises a processor and memory, the memory comprising instructions, e.g. by means of a computer program, which when executed by the processor causes the first wireless device to receive, from the first wireless device, an SA comprising a time offset; to determine a timing reference; to determine a reception timing based on the received time offset and the determined timing reference; and to receive data transmitted from the first wireless device in accordance with the determined reception timing.

The method performed by the first and the second wireless device respectively as well as the first and the second wireless device may have several advantages. One possible advantage is that they support a receiving wireless device being in idle mode. Another possible advantage is that they support inter-cell D2D communication. Still another possible advantage is that interference from D2D communication to the wireless network may be reduced or alleviated since the D2D communication may be synchronised with the wireless network.

DETAILED DESCRIPTION

Briefly described, a first wireless device and a method performed thereby for enabling D2D communication with a second wireless device are provided. Also, a second wireless device and a method performed thereby for enabling D2D communication with a first wireless device are provided. Since the first and the second wireless device may not be time aligned with each other, they may not be able to perform the D2D communication, or may not be able to perform the D2D communication without causing severe interference in a wireless network in which they are operating. In order to time align the second wireless device with the first wireless device, the first wireless device obtains a timing reference and a time offset from a wireless network, which the first wireless device directly or indirectly provides to the second wireless device so that the second wireless device may align itself, or a reception window of the second wireless device, to the first wireless device based on the provided timing reference and time offset.

Exemplifying embodiments of such a method performed by a first wireless device for enabling D2D communication with at least one second wireless device will now be described with reference to FIGS. 1c and 1d.

Figure 1A:
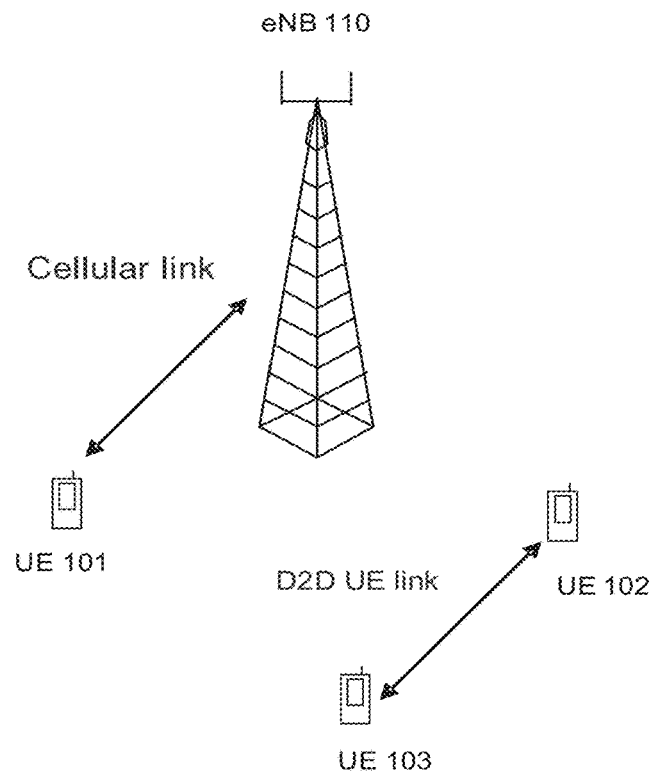
FIG. 1a is a diagram illustrating a mixed cellular and D2D network.
Figure 1B:
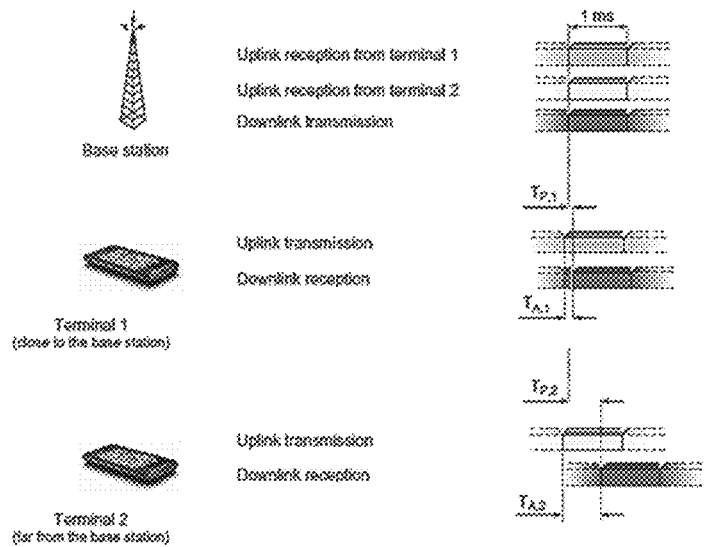
FIG. 1b is a diagram illustrating transmission and reception timings at a base station and two terminals in a pure cellular system using an FDD scheme.
Figure 1C:
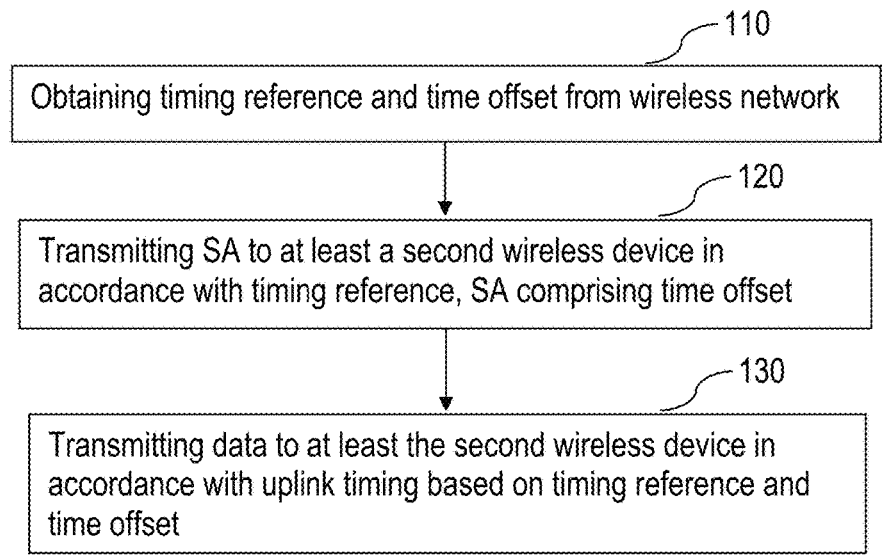
FIG. 1c is a flowchart of a method performed by a first wireless device for enabling D2D communication with a second wireless device according to an exemplifying embodiment.

FIG. 1c illustrates the method comprising: obtaining 110 a timing reference and a time offset, from a wireless network; and transmitting 120, to the at least one second wireless device, a Scheduling Assignment, SA, in accordance with the obtained timing reference, the SA comprising the time offset. The method further comprises transmitting 130 data, to the at least one second wireless device, in accordance with an uplink timing, wherein the uplink timing is based on the time offset and the timing reference.

The first wireless device may for example be in an idle mode and not having any timing reference with regards to the network. As described above, depending on which technology used by the wireless network, the idle mode may be named differently, but in general, a wireless device in idle mode may not have all necessary timing and synchronisation information as a wireless device in an "active" mode. Thus, at some point, the first wireless device obtains the timing reference from the network. The timing reference may be obtained in various ways as will be described in more detail below. However, one example is the timing of a downlink signal, from the network, received by the first wireless device. The timing reference may thus correspond to the reception time of the received downlink signal.

The first wireless device also obtains the time offset. The time offset is dependent on e.g. the distance between the first wireless device and an access point, such as e.g. a radio base station, of the network. A signal transmitted from the access point to the first wireless device is subjected to a propagation delay as the signal travels the path between the access point and the first wireless device. The time offset may be obtained in various ways as will be described in more detail below.

Once the first wireless device has obtained the timing reference and the time offset, the wireless device may synchronise itself with the network. In order for the first and second wireless device to be able to perform D2D communication, they should be synchronised with each other, or in other words, the second wireless device needs to know the timing reference and time offset of the first wireless device, this will also be explained in more detail below. In order for the second wireless device to be able to synchronise, or time align, itself with the first wireless device, the first wireless device transmits the SA comprising the time offset to the second wireless device in accordance with the obtained timing reference. Thus, the first wireless device transmits the SA at a point in time which is based on the timing reference.

In this manner, the second wireless device receives the SA, which will inform the second wireless device that an upcoming data transmission is coming from the first wireless device, so that the second wireless device may adjust its timing for receiving radio signals and/or channels associated with D2D communication from the first wireless device. The second wireless device may thus be in an idle mode not having a timing reference, since the timing reference will be provided from the first wireless device. The first wireless device may then transmit data, to the second wireless device, in accordance with an uplink timing, wherein the uplink timing is based on the time offset and the timing reference.

By the timing reference, the first wireless device knows the timing of the network. By the time offset, the first wireless device knows, and may thus compensate for, e.g. propagation delay between the first wireless device and the access point of the network. Thus the uplink timing may in an example be the timing reference plus the time offset.

The method performed by the first wireless device may have several advantages. One possible advantage is that it supports a receiving wireless device being in idle mode. Another possible advantage is that it supports inter-cell D2D communication. Still another possible advantage is that interference from D2D communication to the wireless network may be reduced or alleviated since the D2D communication may be synchronised with the wireless network.

The timing reference may be a downlink timing, T1.

As described above, the timing reference may be obtained as the timing of a downlink signal, from the network, received by the first wireless device. The timing reference may thus correspond to the reception time of the received downlink signal. Since the wireless network transmits signals, by means of e.g. an access point such as a base station or eNB, the signals transmitted by the network may constitute, or serve as, a timing reference themselves.

The time offset may be a Timing Advance, TA.

In general, TA is defined as the length of time a signal takes to reach the access point such as a base station or eNB from a wireless device, such as e.g. a mobile telephone or a UE, or vice versa. Thus, since the time offset indicates the propagation delay between the wireless device and the access point, TA may be used as the time offset.

The timing reference may be one of Global Positioning System, GPS, time, system time, reception timing associated with signals transmitted by wireless devices, downlink timing determined based on received physical radio signals such as synchronisation signals.

As stated above, the timing reference may be obtained in various ways. One example is GPS time. GPS provides location and time information in all weather conditions, anywhere on or near the Earth where there is an unobstructed line of sight to four or more GPS satellites. The first wireless device may also receive signals from other wireless devices, and assuming that they are synchronised with the network and thus have a timing reference, their signals are transmitted according to the timing reference, and thus the reception time of such signals may serve as a base for the timing reference. Also, as described above, the wireless network may transmit signals in downlink to the first wireless device, which may serve as a base for obtaining the timing reference. One example of downlink signals are synchronisation signals.

According to a further example, timing reference is configured by a node or via higher layers of the wireless communication network, or is pre-defined or decided by the first wireless device.

These are further examples of the timing reference. The wireless network may have an internal clock or timing arrangement which configure or determine the timing reference. The timing reference may further be pre-defined. Alternatively, the timing reference may be decided by the first wireless device.

The time offset information may also be complemented with additional information, e.g. uncertainty associated with the time offset, search window size, etc.

Figure 1D:
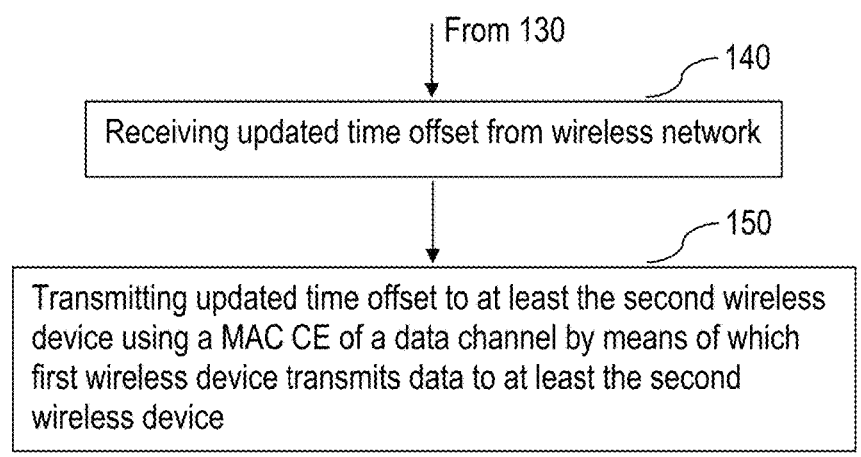
FIG. 1d is a flowchart of a method performed by a first wireless device for enabling D2D communication with a second wireless device according to another exemplifying embodiment.

The method may further comprise, as illustrated in FIG. 1d, receiving 140 an updated time offset from the wireless communication network, transmitting 150 the updated time offset to the second wireless device using a Medium Access Control, MAC, Control Element, CE, of a data channel by means of which the first wireless device transmits data to the second wireless device.

In a wireless network, the wireless devices may generally move around and thus travel towards or away from a base station, or be handed over to another base station. Thus, as the wireless device move around, the propagation delay between the base station and the wireless device typically changes. Consequently, the first wireless device may at some point in time receive an updated time offset from the wireless communication network, to better reflect the current propagation delay. The first wireless device then transmits the updated time offset to the second wireless device so that the first and the second wireless device continue to be synchronised with each other. One example of how the first wireless device may send the updated time offset is by using the MAC CE of the data channel that the first wireless device is using for transmitting data to the second wireless device. Thus, the first wireless device needs not transmit a separate SA to the second wireless device in order to provide the second wireless device with the updated time offset.

Figure 2A:
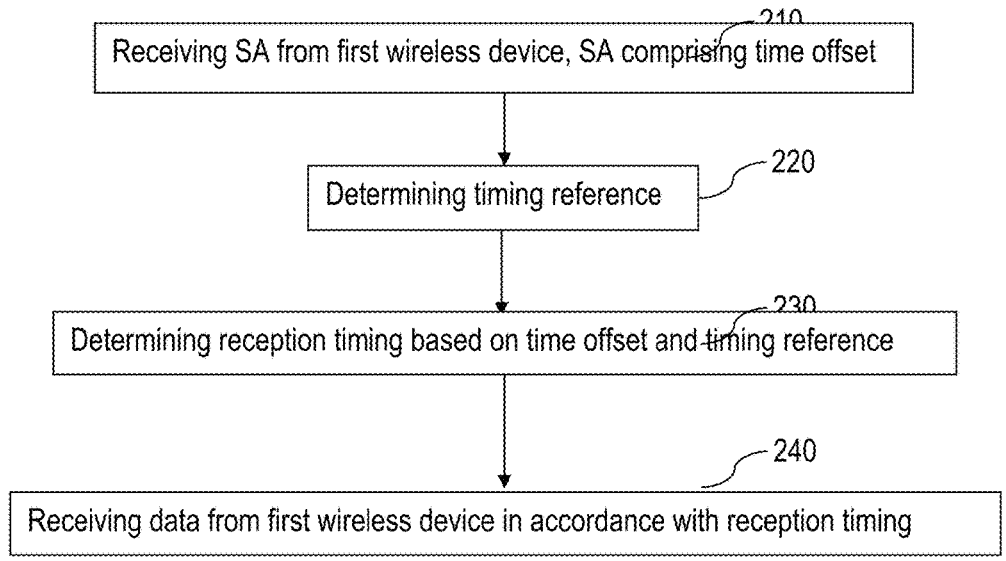
FIG. 2a is a flowchart of a method performed by a second wireless device for enabling D2D communication with a first wireless device according to an exemplifying embodiment.
Figure 2B:
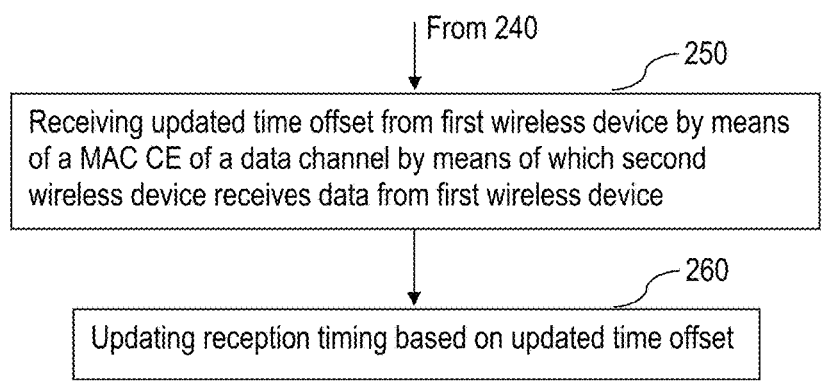
FIG. 2b is a flowchart of a method performed by a second wireless device for enabling D2D communication with a first wireless device according to another exemplifying embodiment.

Embodiments herein also relate to a method performed by a second wireless device for enabling D2D communication with a first wireless device. Examples of such embodiments will now be described with reference to FIGS. 2a and 2b FIG. 2a illustrates the method comprising receiving 210, from the first wireless device, an SA comprising a time offset; and determining 220 a timing reference. The method further comprises determining 230 a reception timing based on the received time offset and the determined timing reference; and receiving 240 data transmitted from the first wireless device in accordance with the determined reception timing.

The second wireless device receives the SA comprising the time offset from the first wireless device. The manner in which the first wireless device transmits the SA is described above with reference to FIG. 1c. The second wireless device receives the SA, and since the SA was transmitted in accordance with a timing reference, the point of time when the second wireless device receives the SA is dependent on the timing reference and thus the second wireless device may determine the timing reference based on the reception time of the received SA. The second wireless device also obtains the time offset that is comprised in the SA. Thus the second wireless device is in possession of both the timing reference and the time offset. Based on these, the second wireless device may determine the reception timing. In other words, the second wireless device adjusts the timing of a reception window so that the timing of the reception window is based on the timing reference and the time offset.

Once the second wireless device has determined the reception timing, the second wireless device is enabled to receive transmissions from the first wireless device. Thus the wireless device receives data transmitted from the first wireless device in accordance with the determined reception timing.

The method performed by the second wireless device has the same possible advantages as the method performed by the first wireless device. One possible advantage is that it supports a receiving wireless device being in idle mode. Another possible advantage is that it supports inter-cell D2D communication. Still another possible advantage is that interference from D2D communication to the wireless network may be reduced or alleviated since the D2D communication may be synchronised with the wireless network.

The timing reference may be based on a reception time of the received SA, or one of GPS time, system time, reception timing associated to signals transmitted by wireless devices, downlink timing determined based on received physical radio signals such as synchronisation signals.

As stated above, the timing reference may be obtained in various ways. One example is GPS time. GPS provides location and time information in all weather conditions, anywhere on or near the Earth where there is an unobstructed line of sight to four or more GPS satellites. The second wireless device may also receive signals from other wireless devices, and assuming that they are synchronised with the network and thus have a timing reference, their signals are transmitted according to the timing reference, and thus the reception time of such signals may serve as a base for the timing reference. Also, as described above, the wireless network may transmit signals in downlink to the second wireless device, which may serve as a base for obtaining the timing reference. One example of downlink signals are synchronisation signals.

However, the second wireless device may in an example not have a timing reference before receiving the SA from the first wireless device and may thus be in an idle mode.

The time offset information may also be complemented with additional information, e.g. uncertainty associated with the time offset, search window size, etc.

The time offset may be a Timing Advance, TA.

As described above in conjunction with the first wireless device, in general, TA is defined as the length of time a signal takes to reach the access point such as a base station or eNB from a wireless device, such as e.g. a mobile telephone or a UE, or vice versa. Thus, since the time offset indicates the propagation delay between the wireless device and the access point, TA may be used as the time offset.

The method may further comprise, as illustrated in FIG. 2b, receiving 250 an updated time offset from the first wireless device by means of a MAC CE of a data channel by means of which the second wireless device receives data from the first wireless device, and updating 260 the uplink timing based on the received updated time offset.

The wireless devices may generally move around and thus travel towards or away from a base station, or be handed over to another base station. Thus, as the wireless device move around, the propagation delay between the base station and the wireless device typically changes. Assuming the first wireless device has moved around and received an updated time offset from the network, the first network node will notify the second wireless device as described above. An example is transmitting the updated time offset by means of the MAC CE of the data channel by means of which the first wireless device transmits data to the first wireless device. Thus, the second wireless device receives the updated time offset by means of the MAC CE of the data channel by means of which the second wireless device receives data from the first wireless device. The second wireless device then updates the uplink timing based on the received updated time offset.

Embodiments herein also relate to a first wireless device adapted for enabling D2D communication with at least one second wireless device. The first wireless device has the same objects, technical features and advantages as the method performed by the first wireless device. The first wireless device will hence only be described in brief in order to avoid unnecessary repetition.

Figure 3:
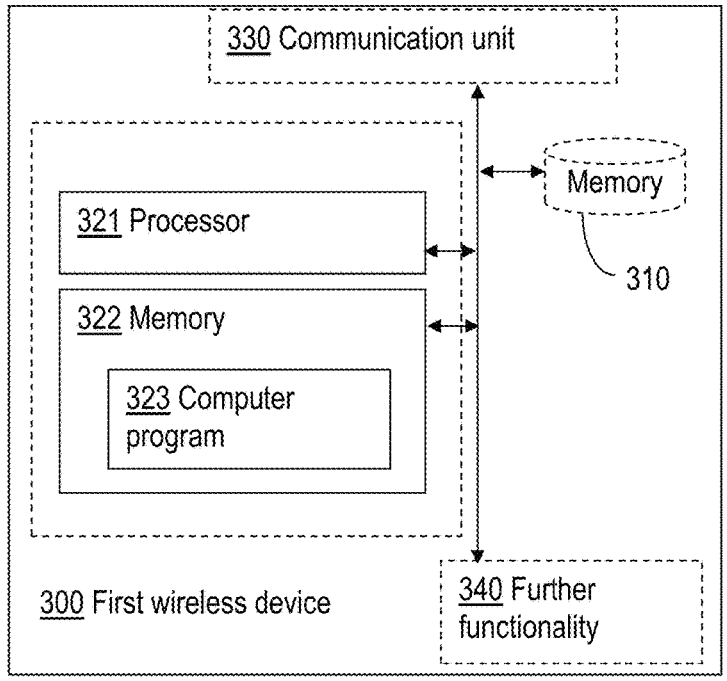
FIG. 3 is a block diagram of a first wireless device adapted for enabling D2D communication with a second wireless device according to an exemplifying embodiment.

FIG. 3 illustrates the first wireless device comprising a processor 321 and memory 322, the memory comprising instructions, e.g. by means of a computer program 323, which when executed by the processor 321 causes the first wireless device 300 to obtain a timing reference and a time offset, from a wireless network; to transmit, to the at least one second wireless device, an SA in accordance with the obtained timing reference, the SA comprising the time offset; and to transmit data, to the at least one second wireless device, in accordance with an uplink timing, wherein the uplink timing is based on the time offset and the timing reference.

The first wireless device has the same possible advantages as the method performed by the first wireless device. One possible advantage is that it supports a receiving wireless device being in idle mode. Another possible advantage is that it supports inter-cell D2D communication. Still another possible advantage is that interference from D2D communication to the wireless network may be reduced or alleviated since the D2D communication may be synchronised with the wireless network.

The timing reference may be a downlink timing, T1.

The time offset may be a TA.

The timing reference may be one of GPS time, system time, reception timing associated with signals transmitted by wireless devices, downlink timing determined based on received physical radio signals such as synchronisation signals.

According to a further example, timing reference is configured by a node or via higher layers of the wireless communication network, or is pre-defined or decided by the first wireless device.

In an example, the memory 322 further comprises instructions, which when executed by the processor 321 causes the first wireless device 300 to receive an updated time offset from the wireless communication network, and to transmit the updated time offset to the second wireless device using a Medium Access Control, MAC, Control Element, CE, of a data channel by means of which the first wireless device transmits data to the second wireless device.

Embodiments herein also relate to a second wireless device adapted for enabling D2D communication with a first wireless device. The second wireless device has the same objects, technical features and advantages as the method performed by the second wireless device. The second wireless device will hence only be described in brief in order to avoid unnecessary repetition.

Figure 4:
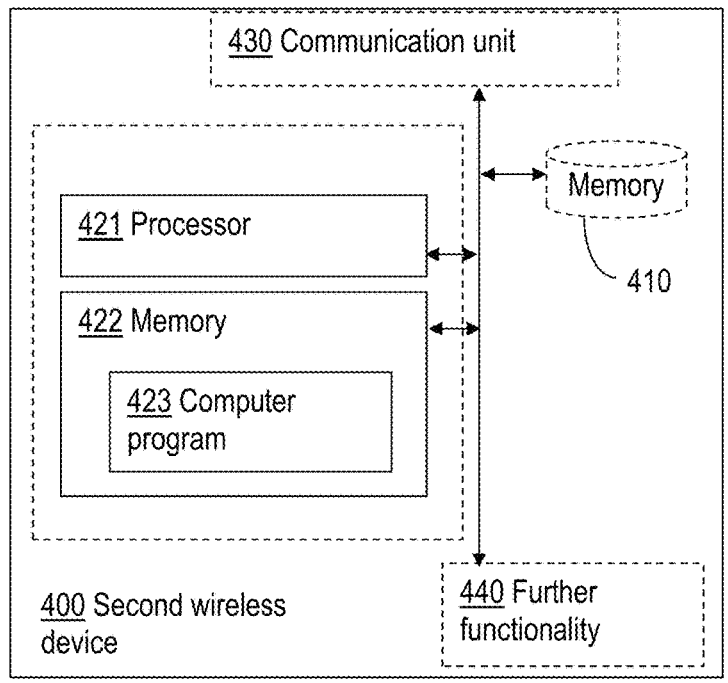
FIG. 4 is a block diagram of a second wireless device adapted for enabling D2D communication with a first wireless device according to an exemplifying embodiment.

FIG. 4 illustrates the second wireless device comprising a processor 421 and memory 422, the memory comprising instructions, e.g. by means of a computer program 423, which when executed by the processor 421 causes the first wireless device 400 to receive, from the first wireless device, an SA comprising a time offset; to determine a timing reference; to determine a reception timing based on the received time offset and the determined timing reference; and to receive data transmitted from the first wireless device in accordance with the determined reception timing.

The second wireless device has the same possible advantages as the method performed by the second wireless device. One possible advantage is that it supports a receiving wireless device being in idle mode. Another possible advantage is that it supports inter-cell D2D communication. Still another possible advantage is that interference from D2D communication to the wireless network may be reduced or alleviated since the D2D communication may be synchronised with the wireless network.

The timing reference may be based on a reception time of the received SA, or one of GPS time, system time, reception timing associated to signals transmitted by wireless devices, downlink timing determined based on received physical radio signals such as synchronisation signals.

The time offset may be a TA.

In an example, the memory 422 further comprises instructions, which when executed by the processor 421 causes the second wireless device 400 to receive an updated time offset from the first wireless device by means of a Medium Access Control, MAC, Control Element, CE, of a data channel by means of which the second wireless device receives data from the first wireless device, and to update the uplink timing based on the received updated time offset.

Embodiments herein also relate to a first wireless device for enabling D2D communication with at least one second wireless device. The first wireless device has the same objects, technical features and advantages as the method performed by the first wireless device, and the first wireless device as described above with reference to FIG. 3. The first wireless device will hence only be described in brief in order to avoid unnecessary repetition.

Figure 5:
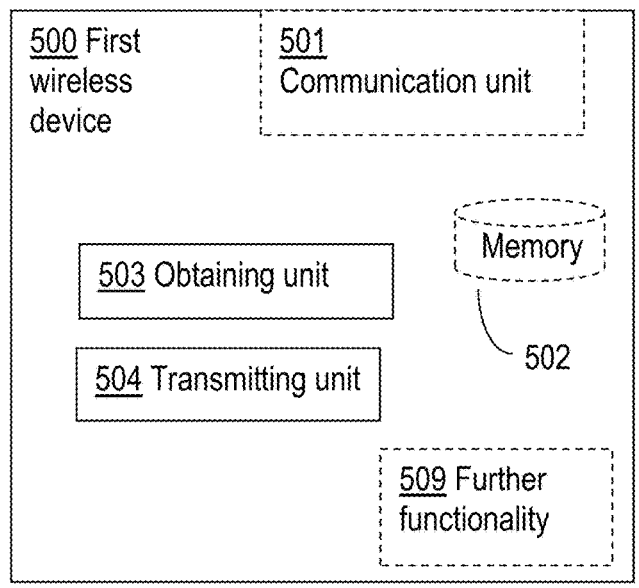
FIG. 5 is a block diagram of a first wireless device for enabling D2D communication with a second wireless device according to an exemplifying embodiment.

FIG. 5 illustrates the first wireless device comprising an obtaining unit 503 for obtaining a timing reference and a time offset, from a wireless network; and a transmitting unit 504 for transmitting, to the at least one second wireless device, an SA in accordance with the obtained timing reference, the SA comprising the time offset, and for transmitting data, to the at least one second wireless device, in accordance with an uplink timing, wherein the uplink timing is based on the time offset and the timing reference.

The first wireless device has the same possible advantages as the method performed by the first wireless device and the first wireless device described in conjunction with FIG. 3. One possible advantage is that it supports a receiving wireless device being in idle mode. Another possible advantage is that it supports inter-cell D2D communication. Still another possible advantage is that interference from D2D communication to the wireless network may be reduced or alleviated since the D2D communication may be synchronised with the wireless network.

Embodiments herein also relate to a second wireless device for enabling D2D communication with a first wireless device. The second wireless device has the same objects, technical features and advantages as the method performed by the second wireless device and the second wireless device described above in conjunction with FIG. 4. The second wireless device will hence only be described in brief in order to avoid unnecessary repetition.

Figure 6:
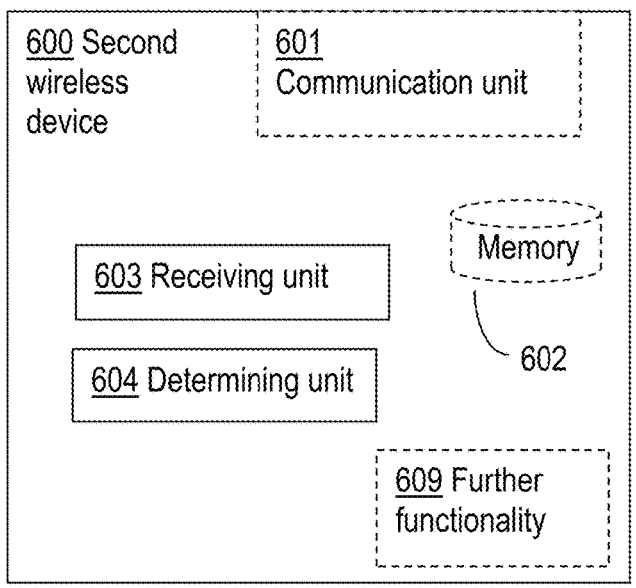
FIG. 6 is a block diagram of a second wireless device for enabling D2D communication with a first wireless device according to an exemplifying embodiment.

FIG. 6 illustrates the second wireless device 600 comprising a receiving unit 603 for receiving, from the first wireless device, an SA comprising a time offset; and a determining unit 604 for determining a timing reference and for determining a reception timing based on the received time offset and the determined timing reference; wherein the receiving unit 603 is also for receiving data transmitted from the first wireless device in accordance with the determined reception timing.

The second wireless device has the same possible advantages as the method performed by the second wireless device and the second wireless device described above in conjunction with FIG. 4. One possible advantage is that it supports a receiving wireless device being in idle mode. Another possible advantage is that it supports inter-cell D2D communication. Still another possible advantage is that interference from D2D communication to the wireless network may be reduced or alleviated since the D2D communication may be synchronised with the wireless network.

In FIG. 5, the first wireless device 500 is also illustrated comprising a communication unit 501. Through this unit, the first wireless device 500 is adapted to communicate with other nodes and/or entities in the wireless communication network. The communication unit 501 may comprise more than one receiving arrangement. For example, the communication unit 501 may be connected to both a wire and an antenna, by means of which the first wireless device 500 is enabled to communicate with other nodes and/or entities in the wireless communication network. Similarly, the communication unit 502 may comprise more than one transmitting arrangement, which in turn are connected to both a wire and an antenna, by means of which the first wireless device 500 is enabled to communicate with other nodes and/or entities in the wireless communication network. The first wireless device 500 further comprises a memory 502 for storing data. Further, the first wireless device 500 may comprise a control or processing unit (not shown) which in turn is connected to the different units 503-504. It shall be pointed out that this is merely an illustrative example and the first wireless device 500 may comprise more, less or other units or modules which execute the functions of the first wireless device 500 in the same manner as the units illustrated in FIG. 5.

It should be noted that FIG. 5 merely illustrates various functional units in the first wireless device 500 in a logical sense. The functions in practice may be implemented using any suitable software and hardware means/circuits etc. Thus, the embodiments are generally not limited to the shown structures of the first wireless device 500 and the functional units. Hence, the previously described exemplary embodiments may be realised in many ways. For example, one embodiment includes a computer-readable medium having instructions stored thereon that are executable by the control or processing unit for executing the method steps in the first wireless device 500. The instructions executable by the computing system and stored on the computer-readable medium perform the method steps of the first wireless device 500 as set forth in the claims.

In FIG. 6, the second wireless device 600 is also illustrated comprising a communication unit 601. Through this unit, the second wireless device 600 is adapted to communicate with other nodes and/or entities in the wireless communication network. The communication unit 601 may comprise more than one receiving arrangement. For example, the communication unit may be connected to both a wire and an antenna, by means of which the second wireless device 600 is enabled to communicate with other nodes and/or entities in the wireless communication network. Similarly, the communication unit 601 may comprise more than one transmitting arrangement, which in turn are connected to both a wire and an antenna, by means of which the second wireless device 600 is enabled to communicate with other nodes and/or entities in the wireless communication network. The second wireless device 600 further comprises a memory 602 for storing data. Further, the second wireless device 600 may comprise a control or processing unit (not shown) which in turns is connected to the different units 603-604. It shall be pointed out that this is merely an illustrative example and the second wireless device 600 may comprise more, less or other units or modules which execute the functions of the second wireless device 600 in the same manner as the units illustrated in FIG. 6.

It should be noted that FIG. 6 merely illustrates various functional units in the second wireless device 600 in a logical sense. The functions in practice may be implemented using any suitable software and hardware means/circuits etc. Thus, the embodiments are generally not limited to the shown structures of the second wireless device 600 and the functional units. Hence, the previously described exemplary embodiments may be realised in many ways. For example, one embodiment includes a computer-readable medium having instructions stored thereon that are executable by the control or processing unit for executing the method steps in the second wireless device 600. The instructions executable by the computing system and stored on the computer-readable medium perform the method steps of the second wireless device 600 as set forth in the claims.

Figure 7:
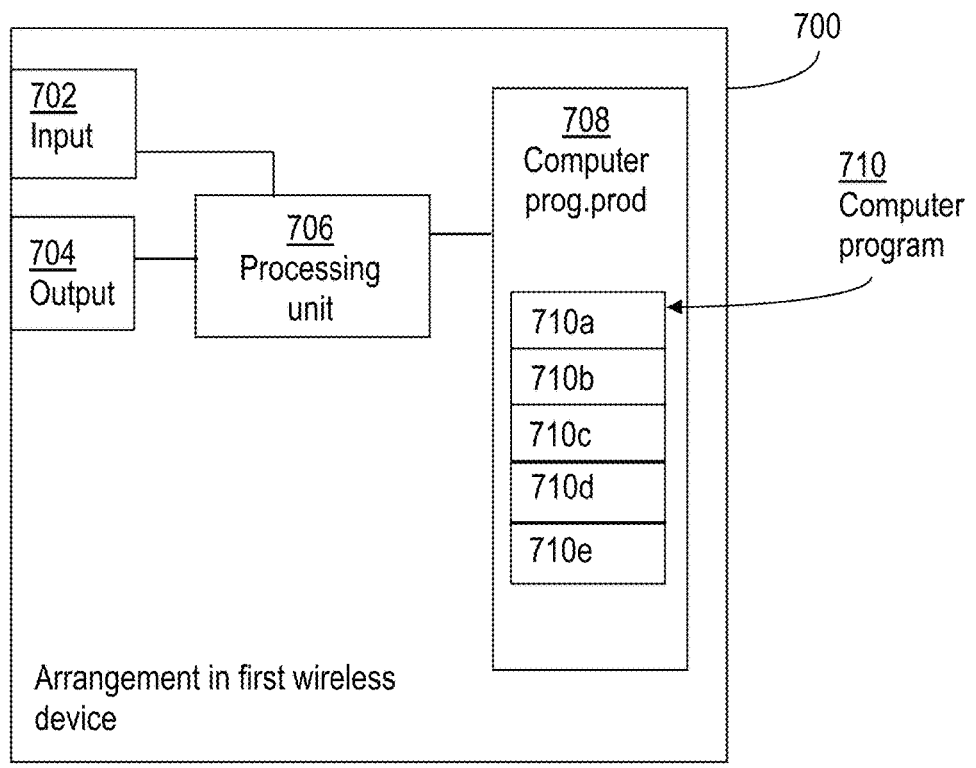
FIG. 7 is a block diagram of an arrangement in a first wireless device for enabling D2D communication with a second wireless device according to an exemplifying embodiment.

FIG. 7 schematically shows an embodiment of an arrangement in a first wireless device 700. Comprised in the arrangement in the first wireless device 700 are here a processing unit 706, e.g. with a Digital Signal Processor, DSP. The processing unit 706 may be a single unit or a plurality of units to perform different actions of procedures described herein. The first wireless device 700 may also comprise an input unit 702 for receiving signals from other entities, and an output unit 704 for providing signal(s) to other entities. The input unit and the output unit may be arranged as an integrated entity or as illustrated in the example of FIG. 5, as one or more interfaces 501.

Furthermore, the first wireless device 700 comprises at least one computer program product 708 in the form of a non-volatile memory, e.g. an Electrically Erasable Programmable Read-Only Memory, EEPROM, a flash memory and a hard drive. The computer program product 708 comprises a computer program 710, which comprises code means, which when executed in the processing unit 706 in the arrangement in the first wireless device 700 causes the first wireless device to perform the actions e.g. of the procedure described earlier in conjunction with FIGS. 1c and 1d.

The computer program 710 may be configured as a computer program code structured in computer program modules 710a-710e. Hence, in an exemplifying embodiment, the code means in the computer program of the first wireless device 700 comprises an obtaining unit, or module, for obtaining a timing reference and a time offset, from a wireless network The computer program further comprises a transmitting unit, or module, for transmitting, to the second wireless device, an SA in accordance with the obtained timing reference, the SA comprising the time offset, and for transmitting data, to the second wireless device, in accordance with an uplink timing, wherein the uplink timing is based on the time offset and the timing reference.

The computer program modules could essentially perform the actions of the flow illustrated in FIG. 1c, to emulate the first wireless device 500. In other words, when the different computer program modules are executed in the processing unit 706, they may correspond to the units 503-505 of FIG. 5.

Figure 8:
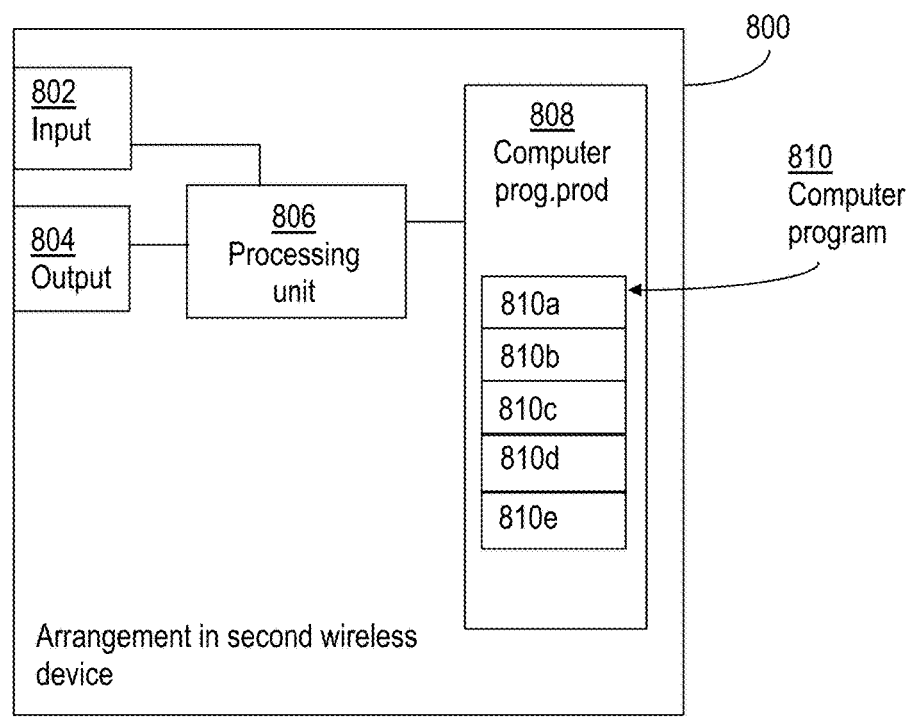
FIG. 8 is a block diagram of a second wireless device for enabling D2D communication with a first wireless device according to an exemplifying embodiment.

FIG. 8 schematically shows an embodiment of a second wireless device 800. Comprised in the second wireless device 800 are here a processing unit 806, e.g. with a Digital Signal Processor. The processing unit 806 may be a single unit or a plurality of units to perform different actions of procedures described herein. The second wireless device 800 may also comprise an input unit 802 for receiving signals from other entities, and an output unit 804 for providing signal(s) to other entities. The input unit and the output unit may be arranged as an integrated entity or as illustrated in the example of FIG. 6, as one or more interfaces 601.

Furthermore, the second wireless device 800 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the second wireless device 800 causes the second wireless device 800 to perform the actions e.g. of the procedure described earlier in conjunction with FIGS. 2a and 2b.

The computer program 810 may be configured as a computer program code structured in computer program modules 810a-810e. Hence, in an exemplifying embodiment, the code means in the computer program of the second wireless device 800 comprises an receiving unit, or module, for receiving, from the first wireless device, an SA comprising a time offset. The computer program further comprises a determining unit, or module, for determining a timing reference, and for determining reception timing based on the received time offset and the determined timing reference. The receiving unit, or module, is further for data transmitted from the first wireless device in accordance with the determined reception timing.

The computer program modules could essentially perform the actions of the flow illustrated in FIG. 2a, to emulate the second wireless device 600. In other words, when the different computer program modules are executed in the processing unit 806, they may correspond to the units 603-604 of FIG. 6.

Although the code means in the respective embodiments disclosed above in conjunction with FIGS. 5 and 6 are implemented as computer program modules which when executed in the respective processing unit causes the first wireless device and the second wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the first wireless device and the second wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

Figure 9A:
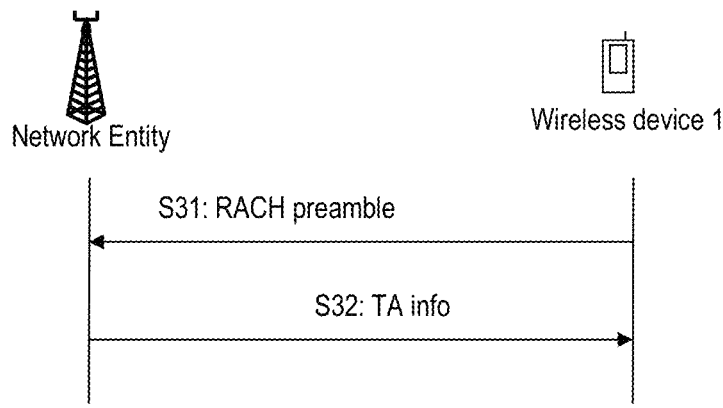
FIG. 9a is a sequence diagram illustrating a procedure for a wireless terminal entering a CONNECTED mode and obtaining TA information from a network.
Figure 9B:
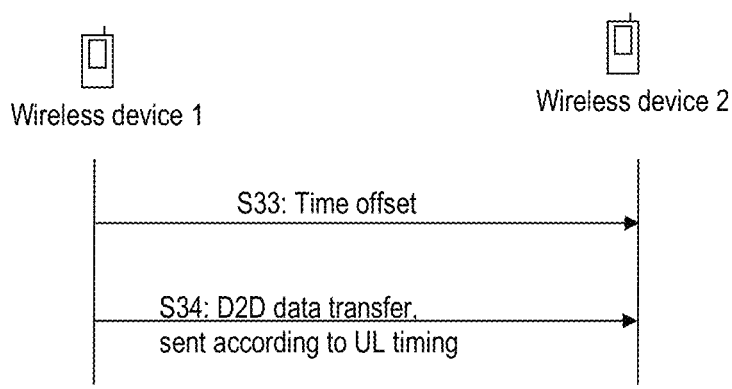
FIG. 9b is a sequence diagram illustrating a procedure for time aligning a wireless device in a CONNECTED mode and a wireless device in IDLE mode according to an exemplifying embodiment.

With reference to FIG. 9a and FIG. 9b exemplary embodiments are further shown and described.

FIG. 9a schematically illustrates a procedure for a wireless terminal entering a CONNECTED mode and obtaining TA information from a wireless network. In the case the wireless network is LTE, the connected mode is referred to as RRC_CONNECTED mode.

In a first step S31, wireless device 1, first being in IDLE mode, sends S31 a Random Access Channel preamble to the network entity. The network entity may be a base station, node B or evolved node B, eNB. The RACH preamble is sent to the network in order to obtain timing information from the network and thus get wireless device 1 synchronized with the network, or the network entity. It shall be pointed out that this example is for an LTE wireless network and in case the wireless network employs another technology than LTE, then the signal S31 may be named differently, but the result of sending the signal to the network is that the wireless device 1 obtains timing information from the network.

The network entity determines TA information and sends S32 this TA information to the wireless device 1. The wireless device 1 in this manner becomes connected to the network entity and enters the CONNECTED mode.

FIG. 9*b* is a sequence diagram illustrating a procedure for time aligning a wireless device in a CONNECTED mode and a wireless device in IDLE mode according to a an embodiment of the present disclosure. In FIG. 9*b*, wireless device 1 is in CONNECTED mode and wireless device 2 is in IDLE mode.

Wireless device 2, being in IDLE mode (or RRC_IDLE mode if the wireless network is LTE), occasionally monitors the paging channel transmitted by a wireless access point, e.g. a eNB or a radio base station. Assuming that wireless device 1 and wireless device 2 are relatively close to each other (i.e. close enough to being enabled to establish a D2D connection with each other) the paging channel may be transmitted by the network entity illustrated in FIG. 9*a*. Additionally to occasionally monitoring the paging channel, wireless device 2 also monitors at least one D2D channel, e.g. a D2D discovery channel.

Wireless device 1 sends S33 a time offset to wireless device 2. Wireless device 1 may send the time offset on a D2D channel which is being monitored by wireless device 2. The time offset is in an example based on TA information that wireless device 1 previously has received from a network entity to which wireless device 1 is connected. Another example of sending S33 the time offset to wireless device 2 is by sending it on a channel for scheduling assignments. As described before, aA channel for scheduling assignments may be seen as a control channel which is used by the wireless device 1, i.e. a transmitting wireless device, to indicate the resource allocation information to the receiving wireless device, i.e. wireless device(s) 2 in this example.

When wireless device 2 obtains (i.e. receives in this example) the time offset and adjusts its timing for receiving radio signals and/or channels associated with D2D communication from wireless device 1.

In this manner, wireless device 1 and wireless device 2 may be aligned with each other and wireless device 1 may e.g. send S34 data according to an uplink timing defined by the time offset sent from wireless device 1 to wireless device 2.

It shall be pointed out that a D2D communication may take place between wireless device 1 and a plurality of wireless devices. In other words, the time offset sent/broadcasted in S33 by wireless device 1 may be received by a plurality of wireless devices 2.

Wireless device(s) 2 may further previously have obtained downlink timing by a downlink synchronization channel to which wireless device(s) 2 may listen to being in IDLE mode. Another example of how the wireless device(s) 2 may obtain downlink timing is to listen for a synchronization signal from wireless device 1.

Wireless device 1 may send the time offset to wireless device 2 in different ways. In one example, wireless device 1 sends out data, e.g. scheduling assignment information according to a reference timing T1 which contains the TA information received from the network entity. In another example, the wireless device 1 sends, or signals, the time offset with regard to the reference timing T1 to wireless device(s) 2.

The signalling assignment may comprise different information, e.g. resource allocation from transmitter to receiver, i.e. from wireless device 1 to wireless device 2.

In the above, wireless device 1 and 2 may be terminals, UEs, etc. wireless device 1 may also be a relay radio node relaying signals or data for D2D communication. In one example, wireless device 1 may be in RRC_CONNECTED, and wireless device 2 may be in RRC_IDLE (if the wireless communication network is LTE) as described before. Further, D2D communication may be broadcast communication, multicast or group communication, or even unicast communication.

For the operation of wireless device 2: this solution focuses on the Rx implementation and shifting a receiver window according to the signalled time offset. The solution may apply to reception of any D2D channel that has TA information, independently of that being a data or control channel.

For the operation of wireless device 1: although in the example above, the TA information may be included in a SA (scheduling assignment), it does not need to be limited to the assumption that there will be a SA, it could be another type of signalling from wireless device 1, i.e. it is independent of the presence of a SA before.

In the following, the solution above is described with more details. It is observed that, even though the solution is described in the context of broadcast, the same steps may be applied for group communication (i.e. one wireless device transmitting to a plurality of wireless devices) and unicast transmission (i.e. when the transmitting wireless device is targeting a single receiving wireless device).

Different embodiments and examples are described below.

1) Obtaining reference time T1 (by wireless device 1 and/or wireless device 2). Reference time T1 may be an absolute or a relative time. Some examples of reference time T1 are: GPS time, system time, or timing associated with transmissions (by another wireless device) or receptions (by wireless device 1) of certain signals (e.g. downlink (DL) timing determined based on received physical radio signals such as synchronization signals). The type of reference time T1 may be configurable by another node or via higher layers, may be pre-defined or may be decided by wireless device 1 or wireless device 2.

2) Obtaining the time offset with regard to the reference time T1. Example step description: wireless device 1 connects to the network: The wireless device 1 may be RRC_CONNECTED, so that it can get the TA information from the network. Besides, more information may be obtained from the network during this procedure, e.g. the resource allocation command (which is however not mandatory for contention based access scheme). The TA information of wireless device 1 should be updated with UE mobility, according to the traditional TA update procedure, i.e. it requires that the wireless device 1 remains connected with the network.

Note: If wireless device 1 is a relay radio for D2D communication, the time offset may then be the time offset (e.g. TA) for this node rather than for the origin wireless device whose transmission is being relayed by wireless device 1. Similarly, the SA may be the SA for wireless device's 1 transmissions (e.g., comprising the relayed data) rather than for the origin wireless device's transmissions whose transmissions are being relayed by wireless device 1.

3) Providing by wireless device 1 the time offset to wireless device(s) 2. The time offset information may also be complemented with additional information, e.g. uncertainty associated with the time offset, search window size, etc. The time offset may be provided to wireless device(s) 2 in a scheduling assignment transmitted by wireless device 1. A search window is a time window during which the receiver collects radio signal samples e.g. for performing a measurement or to detect and/or identify a radio signal.

Example step description: wireless device 1 sends out the SA (scheduling assignment). Thus, the resource allocation of D2D communication is sent out by wireless device 1. As stated in 1), this information may be acquired from the network (contention-free) or decided by wireless device 1 autonomously (contention-based). Along with the scheduling information, the TA information is sent out by wireless device 1. Since the SA is sent according to DL timing, and data is sent according to UL timing, the TA information may actually be used to indicate the timing difference between SA and data. Wireless device(s) 2 obtains the time offset and uses it for calculating receive timing for receiving radio signals and/or channels associated with D2D communication. For the calculation, the wireless device(s) may also use the reference timing T1. Then, the wireless device(s) 2 adjusts its receiver, based on the calculated reception timing, to receive the radio signals and/or channels associated with D2D communication. The wireless device(s) 2 may also use the additional information from wireless device 1: for example, the adjusting of the receiver may comprise centring the search window of the receiver at a time based on the calculated result and configuring the search window size based on an uncertainty or search window size comprised in the additional information obtained from the wireless device 1. For example, wireless device(s) 2 may listen for a synchronization signal transmitted from wireless device 1 in order to obtain the timing reference of T1.

Example step description: wireless device 2 receives the SA: As an RRC_IDLE UE, wireless device 2 can search/monitor the possible SA periodically (this procedure is out of the scope of this proposal) according to DL timing (as indicated in 2), this procedure is coupled with synchronization signal search, peer discovery). When a SA is received and decoded the TA info of the wireless device 1 is made available at the wireless device 2, i.e. the timing difference between the SA and the data, so the wireless device 2 can adjust the timing to decode the data, of which the resource location is also included in the SA.

4) Using the adjusted receiver for receiving the radio signals and/or channels associated with D2D communication. In one embodiment, the wireless device 2 may be required to meet one or more pre-defined requirements (e.g. demodulation or measurement requirements) while receiving the radio signals and/or channels associated with D2D communication. The requirements may also be applicable depending on one or more conditions, e.g. one or more of: search window size, accuracy of the reference timing T1, accuracy of the timing offset, etc.

Example step description: wireless device 2 can decode the data, without being required to be connected, and this can also be applied to inter-cell D2D communication.

Note: Since TA may be included in the SA, it couples the TA update with the SA update procedure, i.e. when there is an update on the TA info at wireless device 1, it can either:

Update the TA using a new SA: this can be used for the new power-on neighbouring wireless device 2. Or if the resource allocation periodicity is shorter than the TA update periodicity.

Update the TA using the data channel: e.g., carry a MAC Control Element (CE) in the data, so that the existing wireless device 2 does not have to re-decode the SA to find the new TA value. This means that the new TA information should be carried by the data channel sent according to the old TA value.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a first wireless device, for enabling Device-to-Device (D2D) communication with at least one second wireless device, the method comprising:
   obtaining, by the first wireless device from a wireless network, a timing reference and a time offset;
   transmitting, from the first wireless device to the at least one second wireless device, a Scheduling Assignment (SA) in accordance with the obtained timing reference, the SA comprising the time offset; and
   transmitting data, from the first wireless device to the at least one second wireless device, in accordance with an uplink timing, wherein the uplink timing is based on the time offset and the timing reference.

2. The method of claim 1, wherein the timing reference is a downlink timing of the wireless network.

3. The method of claim 1, wherein the time offset is a Timing Advance.

4. The method of claim 1, wherein the timing reference is any of:
   GPS time;
   system time;
   reception timing associated with signals transmitted by wireless devices;
   downlink timing determined based on received physical radio signals.

5. The method of claim 1, wherein the timing reference is configured by a node or via higher layers of the wireless network, or is pre-defined or decided by the first wireless device.

6. The method of claim 1, further comprising:
   receiving an updated time offset from the wireless network;
   transmitting the updated time offset to the at least one second wireless device using a Medium Access Control (MAC) Control Element (CE) of a data channel by means of which the first wireless device transmits data to the at least one second wireless device.

7. The method of claim 1, wherein the Scheduling Assignment indicates allocation of resources for the transmission of the data from the first wireless device to the at least one second wireless device via D2D communication.

8. A method, performed by a second wireless device, for enabling Device-to-Device (D2D) communication with a first wireless device, the method comprising:
   receiving, by the second wireless device from the first wireless device, a Scheduling Assignment (SA) comprising a time offset;
   determining a timing reference;
   determining reception timing based on the received time offset and the determined timing reference; and
   receiving data transmitted from the first wireless device in accordance with the determined reception timing.

9. The method of claim 8, wherein the timing reference is based on any of:
   a reception time of the received SA;
   GPS time;
   system time;
   reception timing associated to signals transmitted by wireless devices;
   downlink timing determined based on received physical radio signals.

10. The method of claim 8, wherein the time offset is a Timing Advance.

11. The method of claim 8, further comprising:
receiving an updated time offset from the first wireless device by means of a Medium Access Control (MAC) Control Element (CE) of a data channel by means of which the second wireless device receives data from the first wireless device; and
updating the uplink timing based on the received updated time offset.

12. The method of claim 8, wherein the Scheduling Assignment indicates allocation of resources for the transmission of the data from the first wireless device to the second wireless device via D2D communication.

13. The method of claim 8, wherein determining the timing reference comprises determining the timing reference based on a reception time of the received Scheduling Assignment.

14. A first wireless device configured to enable Device-to-Device (D2D) communication with at least one second wireless device, the first wireless device comprising:
a processing circuit;
memory comprising instructions which when executed by the processing circuit causes the first wireless device to:
obtain, from a wireless network, a timing reference and a time offset;
transmit, to the at least one second wireless device, a Scheduling Assignment (SA) in accordance with the obtained timing reference, the SA comprising the time offset, and
transmit data, to the at least one second wireless device, in accordance with an uplink timing, wherein the uplink timing is based on the time offset and the timing reference.

15. The first wireless device of claim 14, wherein the timing reference is a downlink timing of the wireless network.

16. The first wireless device of claim 14, wherein the time offset is a Timing Advance.

17. The first wireless device of claim 14, wherein the timing reference is any of:
GPS time;
system time;
reception timing associated with signals transmitted by wireless devices;
downlink timing determined based on received physical radio signals.

18. The first wireless device of claim 14, wherein timing reference is configured by a node or via higher layers of the wireless network, pre-defined or decided by the first wireless device.

19. The first wireless device of claim 14, wherein the memory further comprises instructions, which when executed by the processing circuit causes the first wireless device to:
receive an updated time offset from the wireless network; and
transmit the updated time offset to the at least one second wireless device using a Medium Access Control (MAC) Control Element (CE) of a data channel by means of which the first wireless device transmits data to the at least one second wireless device.

20. The first wireless device of claim 14, wherein the Scheduling Assignment indicates allocation of resources for the transmission of the data from the first wireless device to the at least one second wireless device via D2D communication.

21. A second wireless device configured to enable Device-to-Device (D2D) communication with a first wireless device, the second wireless device comprising:
a processing circuit;
memory comprising instructions which when executed by the processing circuit causes the second wireless device to:
receive, from the first wireless device, a Scheduling Assignment (SA) comprising a time offset;
determine a timing reference;
determine a reception timing based on the received time offset and the determined timing reference; and
receive data transmitted from the first wireless device in accordance with the determined reception timing.

22. The second wireless device of claim 21, wherein the timing reference is based any of:
a reception time of the received SA;
GPS time;
system time;
reception timing associated to signals transmitted by wireless devices;
downlink timing determined based on received physical radio signals.

23. The second wireless device of claim 21, wherein the time offset is a Timing Advance.

24. The second wireless device of claim 21, wherein the memory further comprises instructions, which when executed by the processing circuit causes the second wireless device to:
receive an updated time offset from the first wireless device by means of a Medium Access Control (MAC) Control Element (CE) of a data channel by means of which the second wireless device receives data from the first wireless device; and
update the uplink timing based on the received updated time offset.

25. The second wireless device of claim 21, wherein the Scheduling Assignment indicates allocation of resources for the transmission of the data from the first wireless device to the second wireless device via D2D communication.

26. The second wireless device of claim 21, wherein the memory comprises instructions, which when executed by the processing circuit causes the second wireless device to determine the timing reference by determining the timing reference based on a reception time of the received Scheduling Assignment.

\* \* \* \* \*